United States Patent [19]

Okubo et al.

[11] Patent Number: 4,605,387
[45] Date of Patent: Aug. 12, 1986

[54] TENSIONER

[75] Inventors: Kenji Okubo, Tokyo; Yasuaki Kuroki, Chigasaki; Takashi Horikawa, Hiroshima, all of Japan

[73] Assignee: Nippon Seiko Kabushiki Kaisha, Tokyo, Japan

[21] Appl. No.: 724,484

[22] Filed: Apr. 18, 1985

Related U.S. Application Data

[63] Continuation of Ser. No. 207,968, Nov. 18, 1980, abandoned.

[30] Foreign Application Priority Data

Nov. 21, 1979 [JP] Japan .................. 54-160426[U]

[51] Int. Cl.4 ..................... F16H 7/12; F16H 7/10
[52] U.S. Cl. ..................... 474/112; 474/133; 474/135
[58] Field of Search ............. 474/12, 33, 35, 112, 474/133, 135

[56] References Cited

U.S. PATENT DOCUMENTS

| | | | |
|---|---|---|---|
| 1,188,316 | 6/1916 | Pierce | 474/112 |
| 1,232,391 | 7/1917 | Pierce | 474/112 |
| 2,681,533 | 6/1954 | Logeman | 474/112 |
| 2,909,074 | 10/1959 | Scheiterlein | 474/112 |
| 3,176,528 | 4/1965 | Hill | 474/112 |
| 3,272,027 | 9/1966 | Wayman | 474/112 |
| 3,399,582 | 9/1968 | Henry | 474/112 |
| 3,733,919 | 5/1973 | Rupp, II | 474/112 |
| 3,829,176 | 8/1974 | Miokovic | 474/112 |
| 4,003,196 | 7/1977 | Maeda et al. | |
| 4,285,676 | 8/1981 | Kraft | 474/135 |
| 4,504,252 | 3/1985 | Honma | 474/112 |

FOREIGN PATENT DOCUMENTS 97384 7/1977 Japan .

Primary Examiner—Kenneth J. Dorner
Assistant Examiner—Mike Bednarek
Attorney, Agent, or Firm—Wyatt, Gerber, Shoup, Scobey and Badie

[57] ABSTRACT

A tensioner has rolling members disposed between a rotatable outer member and a fixed inner member. The inner member has a bottom wall at at least one end thereof. The bottom wall has therein an eccentric position aperture for position adjustment situated at a position deviated from the axis of the inner member. A fixing bolt extends through said aperture. A spring member having at least one end which can be restrained by the inner member and the other end which can be restrained by the restraining portion of a support member to which the tensioner is mounted is provided within the inner member. Thus, a desired tension may be imparted to a transmission strap contacting the outer member by the spring member.

8 Claims, 11 Drawing Figures

TENSIONER

This application is continuation of Ser. No. 207,968, filed Nov. 18, 1980 now abandoned.

BACKGROUND OF THE INVENTION

1. Field of the Invention

This invention relates to a tensioner for use in a transmission gear using a transmission strap such as V belt, timing belt, flat belt, wire rope or the like.

2. Description of the Prior Art

For example, as a tensioner for automotive vehicle, there is known one which, as shown in FIGS. 1 and 2 of the accompanying drawings, has a rotatable outer member 1a formed by a race member 11a having an inner track and a pulley member 12a fitted to the race member and bearing against a belt 8a and, an inner member 2a formed by a track member 22a having an outer track and a holding member 23a holding the track member, the inner member 2a is fixed to a base 9a, and a plurality of rolling members 3a are disposed between the outer member 1a and the inner member 2a. In such a tensioner, the base 9a is supported for oscillation about a pin 10a fixed to a support member 7a at a position different from the axis of the inner member 2a, and the base 9a is fixed to the support member 7a by means of a fixing bolt 4a in a position wherein the force of a tension spring 6a having one end fixed to the restraining portion 91a of the base 9a and the other end fixed to the support member 7a is balanced with a component of the force of the tension of the belt 8a bearing against the pulley member 2a, whereby a proper tension may be imparted to the belt 8a.

However, mounting such a conventional tensioner requires spaces for the base 9a, the pin 10a, the tension spring 6a, etc. and in addition, if the arrangement of said parts is not proper, a proper tension cannot be imparted to the belt. Therefore, in the case of an automotive vehicle which requires various mechanisms to be compactly arranged in a limited space, such tensioner has encountered a number of difficulties in the design and assembly of the arrangement.

SUMMARY OF THE INVENTION

It is the object of the present invention to eliminate the above-noted problems and to provide a tensioner which requires a reduced number of parts and is light in weight as compared with the conventional tensioner.

The invention will become fully apparent from the following detailed description thereof taken in conjunction with the accompanying drawings.

DESCRIPTION OF THE PREFERRED EMBODIMENTS

Figure 1:
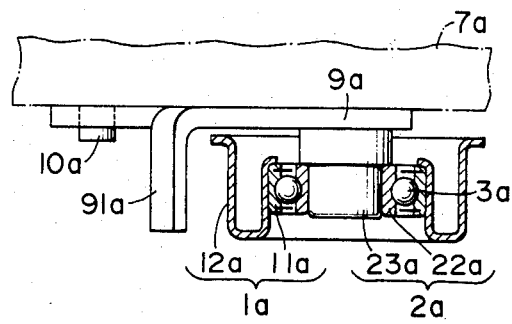
FIG. 1 is a side view partly, in longitudinal crosssection, of a conventional tensioner.
Figure 2:
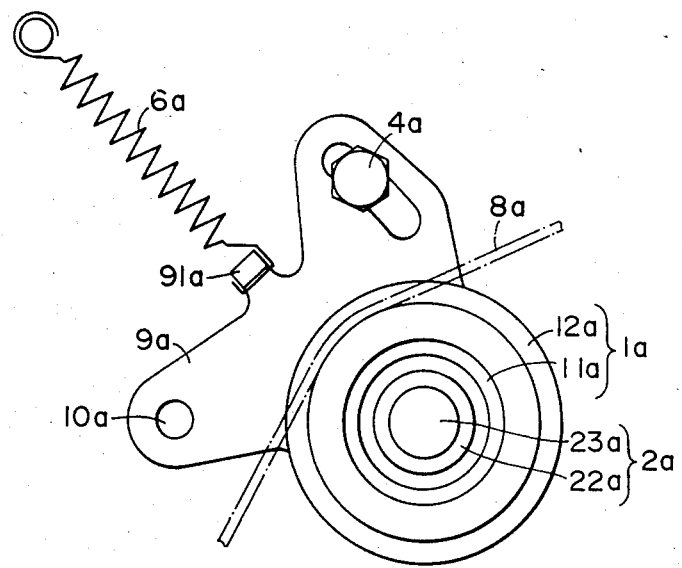
FIG. 2 illustrates the manner in which the conventional tensioner is mounted.

Embodiments of the tensioner according to the present invention will hereinafter be described with reference to FIGS. 3 to 11. Reference numeral 1 designates a rotatable outer member, reference numeral 2 denotes a fixed inner member, and reference numeral 3 designates rolling members present between the outer member 1 and the inner member 2. The inner member 2 has a bottom wall 21 at one end thereof (the one end herein referred to also includes the portion inward of the end face), and the bottom wall 21 has an eccentrically position aperture 211 situated at a position deviated from the axis of the inner member 2 and through which a fixing bolt 4 extends. Reference numeral 5 designates seal members, reference numeral 6 denotes a spring member which is a torsion coil spring, reference numeral 7 designates a support member to which the tensioner is mounted by means of the fixing bolt 4, and reference numeral 8 denotes a belt.

Figure 3:
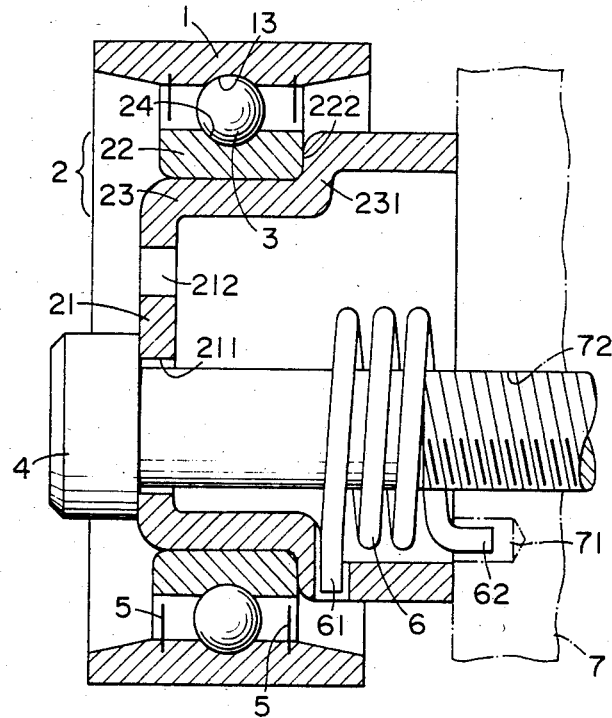
FIG. 3 is a longitudinal cross-sectional side view showing a first embodiment of the tensioner according to the present invention.

FIG. 3 shows a first embodiment of the tensioner according to the present invention. The outer member 1 is formed by a single member having an inner track 13 in which the rolling members 3 roll, and the inner member 2 is formed by a race member 22 having an outer track 24 and a holding member 23 fitted to and holding the inner surface of the race member 22. The holding member 23 has a shoulder 231 against which one end 222 of the race member 22 having the outer track 24 bears.

The holding member 23 is in the shape of a hollow shaft and has the bottom wall 21, and within the holding member 23, there is the torsion coil spring 6 having one end 61 which can be restrained by a opening in the holding member 23 and the other end 62 which can be restrained by the restraining portion 71 of the support member 7.

The bottom wall 21 has, in addition to the eccentric position aperture 211, an aperture 212 engageable by a mounting tool.

Figures 4, 5:
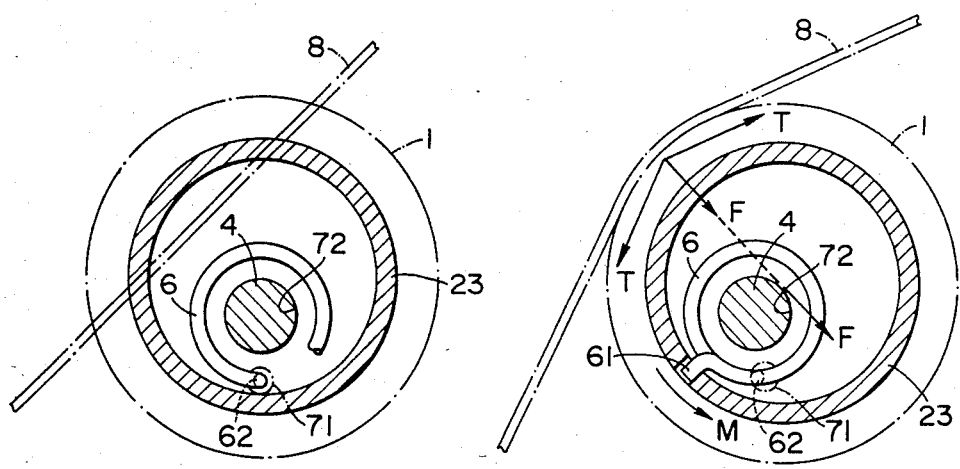
FIGS. 4 and 5 illustrate the mounting relation of the tensioner shown in FIG. 3.

In mounting the thus constructed tensioner to the support member 7 and adjusting the tension of the belt 8, the support member 7 is provided with the restraining portion 71 for restraining the inner end of the torsion coil spring 6 and a threaded hole 72 into which the fixing bolt 4 can be screwed. In the condition as shown in FIG. 4, the fixing bolt 4 is loosened and the inner member is free to turn about the fixing bolt 4. No force is exerted on the torsion coil spring 6, and the belt 8 may pass through the area inward of the outer peripheral surface of the outer member 1, as shown in FIG. 4. Subsequently, if the inner end 62 of the torsion coil spring 6 is restrained by the restraining portion 71 of the support member 7 and the fixing bolt 4 is caused to pass through the eccentric position aperture 211 of the bottom wall 21 and is screwed into the threaded hole 72 of the support member 7, the belt 8 may be caused to bear against the outer peripheral surface of the outer member 1 with the fixing bolt 4 left untightened. Then the tensioner, as shown in FIG. 5, will be caused to rotate about the fixing bolt 4 in a direction to twist the torsion coil spring 6 by a pressure force F to the tensioner resulting from the tension of the belt 8 and will stop in a condition in which the moment around the fixing bolt 4 by the pressure force F is balanced with the moment M resulting from the return force of the torsion coil spring 6.

Figure 6:
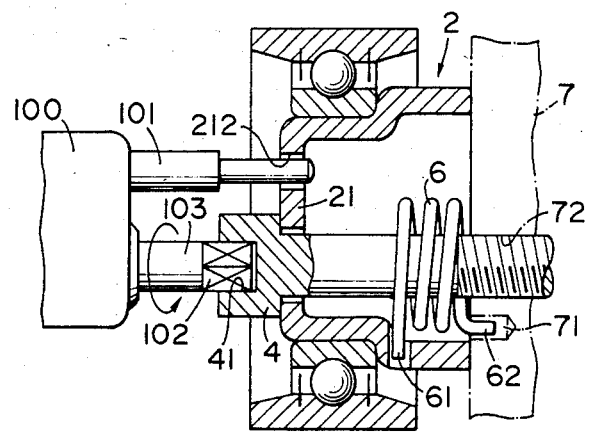
FIG. 6 illustrates the procedure of mounting the tensioner shown in FIG. 3.

If, in this condition, the fixed pin 101 of a mounting tool 100 provided with a fixed pin 101 and a rotary shaft 103 having a hexagonal end portion 102 is engaged with the engaging aperture 212 of the bottom wall 21 and the hexagonal end portion 102 is engaged with the hexagonal aperture 41 of the fixing bolt 4, as is shown in FIG. 6, for example, and the rotary shaft 103 is rotated, then the inner member 2 will not rotate but only the fixing bolt 4 will be rotated to tighten the fixing bolt and fix the tensioner in said balanced condition. Accordingly, if the moment by the return force of the torsion coil spring 6 in said balanced condition is properly designed, the tensioner may be fixed in a condition in which a desired tension is imparted to the belt 8.

Figure 7:
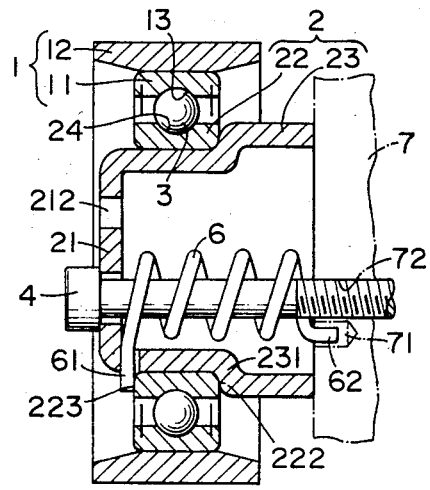
FIGS. 7 to 10 are views similar to FIG. 3 but showing second to fifth embodiments of the tensioner according to the present invention.

FIG. 7 shows a second embodiment of the tensioner according to the present invention. Particularly, a torsion coil spring 6 has one end 61 thereof projected outwardly through the outer peripheral surface of a holder member 23 at a location so as to be adjacent to an end 223 opposite to one end 222 of a race member 22 having an outer track 24, whereby the axial movement of the race member 22 may be controlled. An outer member 1 is formed by a race member 11 having an inner track 13 and a pulley member 12 fitted to the outer peripheral surface of the race member 11 and bearing against a belt.

Figure 8:
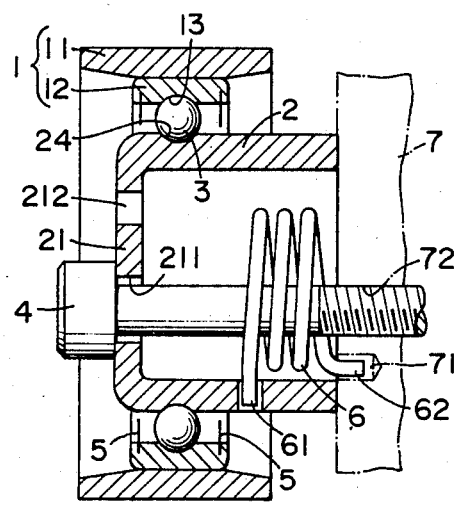

FIG. 8 shows a third embodiment of the tensioner according to the present invention. Paticularly, an inner member 2 is not formed by a race member 22 having an outer track 24 and a holding member 23 as in the above-described first and second embodiments, but is formed by a single member having an outer track 24.

Figure 9:
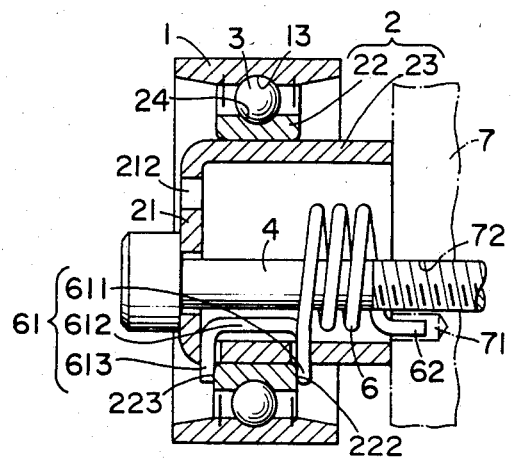

FIG. 9 shows a fourth embodiment of the tensioner according to the present invention. An inner member 2 is formed by a race member 22 having an outer track 24 and a holding member 23 fitted to and holding the inner surface of the race member 22, and the holding member 23 does not have the shoulder as provided in the first embodiment and particularly, one end 61 of a torsion coil spring 6 comprises a projected portion 611 following the turn end portion of the coil and projected from the outer peripheral surface of the coil, an intermediate portion 612 following the projected portion 611 and located at a distance equal to the radius of the coil from the axis of the coil and extending axially of the coil, and a distal end portion 613 following the intermediate portion 612 and extending radially outwardly of the coil. The projected portion 611 is adjacent to one end 222 of the race member 22 having the outer track 24, and the distal end portion 613 is adjacent to the end 223 opposite to said one end 222 of the race member 22 having the outer track 24, and these are projected from the outer peripheral surface of the holding member 23, whereby the axial movement of the race member 22 having the outer track 24 is controlled.

Figure 10:
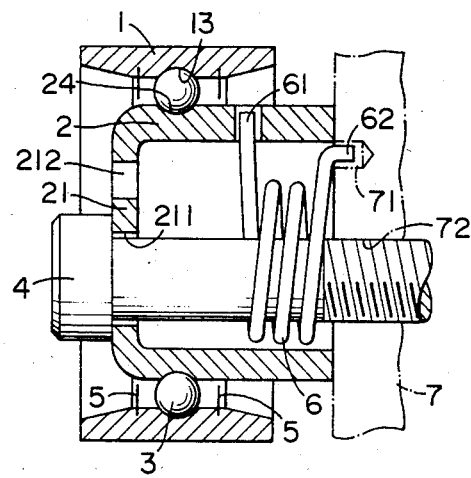
Figure 11:
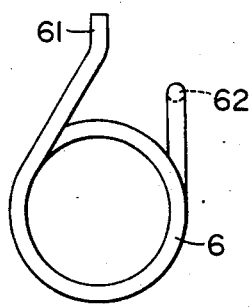
FIG. 11 is a front view of the spring member of the tensioner shown in FIG. 10.

FIG. 10 shows a fifth embodiment of the tensioner according to the present invention. An outer member 1 is formed by a single member having an inner track 13 in which rolling members 3 roll, and an inner member 2 is formed by a single hollow shaft-like member having an outer track 24. A spring member 6, as shown in FIG. 11, is a helical spring having one end 61 and the other end 62 both extending long from a coil, and said one end 61 is restrained by the inner member 2 while said other end 62 is restrained by the restraining portion of a support member 7.

The fifth embodiment requires a decreased number of parts and is simpler in construction and lighter in weight.

As has been described above, the tensioner of the present invention is fixed by a fixing bolt passing through an eccentric position aperture for position adjustment provided in the bottom wall of a fixed inner member, and a spring member having at least one end thereof which can be restrained by the inner member and the other end which can be restrained by the restraining portion of a support member to which the tensioner is mounted is provided within the inner member, and a desired tension is imparted to a transmission strap bearing against an outer member rotated by the spring member and therefore, the necessity of providing a base and a tension spring which have been required in the conventional tensioner is eliminated and the space in which the tensioner is installed may be small and the design and assembly of the arrangement is very easy.

The above embodiments have been described with respect to an example in which the bottom wall of the inner member has an engaging aperture for the mounting tool, but alternatively, the engaging aperture may be provided in any other portion than the bottom wall of the inner member and also, the outer peripheral surface of the inner member may be formed into a shape which will permit the use of a mounting tool such as a spanner. Further, if the free length of the torsion coil spring is selected such that the fixing bolt is tightened and the torsion coil spring is compressed, the elements for the mounting tool may be eliminated by utilizing a force acting such that the coil is restored as the torsion coil spring is compressed or by other means whereby the inner member is not rotated during the tightening of the fixing bolt.

Further, in the above-described embodiments, the spring member has been a torsion coil spring, whereas it may be any spring member which will create a moment around the fixing bolt and is not restricted to the torsion coil spring.

In addition, the construction of the details such as the form of the bearing is neither restricted to the illustrated embodiments, but may be suitably changed within the scope of the appended claims.

What we claim is:

1. A tensioner for imparting a desired tension to a belt, comprising a cylindrical inner member fixed to a support, said inner member having a race member with an outer track, a rotatable outer member engaged with said belt, and rolling members disposed between said outer track and said outer member, the improvement comprising:

said inner member having a wall portion spaced from said support and having therein an aperture located eccentrically with respect to the axis of said inner member;

biasing means including a resilient member disposed within said inner member and having at least one end restrained by said inner member and the other end restrained by the support, said resilient member including a portion extending outwardly from said inner member and holding said race member against axial movement; and means including a single bolt threaded within said support to extend through said aperture for supporting said inner member so that it may rotate eccentrically about said bolt until the moment applied by said belt corresponds to the opposite moment applied by said resilient member, whereupon said bolt can be tightened to said support to fix the inner member in place.

2. A tensioner according to claim 1, wherein said resilient member includes a coil spring through which the bolt is extended.

3. A tensioner for imparting a desired tension to a belt, comprising a cylindrical inner member fixed to a support, said inner member having a race member with an outer track and a holding member having a shoulder against which one end of said race member bears, a rotatable outer member engaged with said belt, and rolling members disposed between said race member and said outer member, the improvement comprising:

said inner member having a wall portion spaced from said support and having therein an aperture located eccentrically with respect to the axis of said inner member;

biasing means including a resilient member disposed within said inner member and having at least one end restrained by said inner member and the other end restrained by the support, said resilient member having a portion extending outwardly from said inner member and holding the outer end of the said race member against said shoulder;

means including a single bolt threaded within said support to extend through said aperture for supporting said inner member so that it may rotate eccentrically about said bolt until the moment applied by said belt corresponds to the opposite moment applied by said resilient member, whereupon said bolt can be tightened to said support to fix the inner member in place.

4. A tensioner adapted to be fixed to a flat plane of a support for imparting a desired tension to a belt, comprising a cylindrical inner member fixed to the support and a rotatable outer member engaged with said belt and rolling members disposed between said inner member and said outer member to withstand the radial and axial loads applied thereto, the improvement comprising:

said inner member including a hollow cylindrical portion having an open end abutted against the flat plane of the support and a wall portion radially extended to close the other end of the hollow cylindrical portion, the wall portion being formed in the axial direction with a main aperture located eccentrically with respect to the axis of said inner member and at least one further aperture for engaging a mounting tool for applying torque to the tensioner;

the outer member being disposed on said inner member through said rolling members and spaced from the plane of the support by a predetermined distance;

an axially wound helical coil spring disposed within the hollow cylindrical portion of said inner member and having one end radially extended into an aperture formed radially through the hollow cylindrical portion so that the said end is restrained by said inner member and the other end of said spring axially extended and restrained by a hole in the support;

a bolt threaded within said support and extending through said main aperture and through said axially wound coil spring to support said inner member so that it may rotate ecentrically about said bolt until the moment applied by said belt corresponds to the opposite moment applied by said spring, whereupon said bolt can be tightened to said support to fix the inner member in place.

5. A tensioner according to claim 4, wherein the wall portion of said inner member further has means for engaging a mounting tool.

6. A tensioner according to claim 4, wherein the inner member included a cylindrical element abutted against the support and an inner race element.

7. A tensioner according to claim 6, said cylindrical element having a shoulder against which one end of said inner race element bears.

8. In a tensioner for imparting a desired tension to a belt, comprising a cylindrical inner member fixed to a flat plane of a support, said inner member having a race member with an outer track and a holding member having a shoulder against which one end of said race member bears, a rotatable outer member engaged with said belt, and rolling members disposed between said race member and said outer member, the improvement comprising:

said holding member including a hollow cylindrical portion having an open end abutted against the flat plane of the support and a wall portion radially extended to close the other end of the hollow cylindrical portion, the wall portion being formed in the axial direction with a main aperture located eccentrically with respect to the axis of said holding member and at least one further aperture for engaging a mounting tool for applying torque to the tensioner;

the outer member being disposed on said race member through said rolling members and spaced from the plane of the support by a predetermined distance;

an axially wound helical coil spring disposed within the hollow cylindrical portion of said holding member and having one end radially extended into an aperture formed through the hollow cylindrical portion so that the said end is restrained by said holding member and the other end of said spring axially extended and restrained by a hole in the support;

a bolt threaded within said support and extending through said main aperture and through said axially wound coil spring to support said holding member so that it may rotate eccentrically about said bolt until the moment applied by said belt corresponds to the opposite moment applied by said spring, whereupon said bolt can be tightened to said support to fix the inner member in place.

* * * * *